US006901361B1

United States Patent
Portilla

(10) Patent No.: US 6,901,361 B1
(45) Date of Patent: May 31, 2005

(54) COMPUTERIZED TRANSLATOR OF LANGUAGES UTILIZING INDEXED DATABASES OF CORRESPONDING INFORMATION ELEMENTS

(75) Inventor: Gustavo Portilla, Pereira (CO)

(73) Assignee: Digital Esperanto, Inc., Miami, FL (US)

( * ) Notice: Subject to any disclaimer, the term of this patent is extended or adjusted under 35 U.S.C. 154(b) by 718 days.

(21) Appl. No.: 09/351,208

(22) Filed: Jul. 9, 1999

(51) Int. Cl.[7] .......................... G06F 17/20; G06F 17/28
(52) U.S. Cl. .................................. 704/8; 704/2
(58) Field of Search ................................ 704/1, 2, 3, 4, 704/5, 6, 7, 8, 9, 10; 707/531, 532, 533, 536

(56) References Cited

U.S. PATENT DOCUMENTS

| | | | | |
|---|---|---|---|---|
| 5,075,850 A | * | 12/1991 | Asahioka et al. | 704/2 |
| 5,268,839 A | * | 12/1993 | Kaji | 704/3 |
| 5,490,061 A | * | 2/1996 | Tolin et al. | 704/2 |
| 5,523,943 A | * | 6/1996 | Maruta et al. | 704/4 |
| 5,541,837 A | * | 7/1996 | Fushimoto | 704/2 |
| 5,751,957 A | * | 5/1998 | Hiroya et al. | 709/203 |
| 5,848,386 A | * | 12/1998 | Motoyama | 704/5 |
| 5,852,798 A | * | 12/1998 | Ikuta et al. | 704/2 |
| 5,907,821 A | * | 5/1999 | Kaji et al. | 704/4 |

* cited by examiner

Primary Examiner—Patrick N. Edouard
(74) Attorney, Agent, or Firm—J. Sanchelima

(57) ABSTRACT

A system for coding and decoding languages that includes a first set of computerized databases and each of database storing a predetermined number of indexed information elements (such as words) and a second set of computerized databases wherein each database includes a predetermined number of structural arrangements for using the information elements. The indexed information elements are classified by the component class of a sentence or phrase. They may be classified as verbs, adjectives, etc. and this holds true for the same indexed entry for the different databases for a particular information element. The system decodes the information elements in a sentence, or phrase and matches a corresponding structural arrangement in a given language which holds for the other language.

4 Claims, 4 Drawing Sheets

|  | ENGLISH | SPANISH |
|---|---|---|
| 1 | . . . | . . . |
| 2 | . . . | . . . |
| . | . . . | . . . |
| . | . . . | . . . |
| . | . . . | . . . |
| 100,001 | house | casa |
| . |  |  |
| 115,033 | view | vista |
| . |  |  |
| . |  |  |
| 200,003 | to house | albergar |
| . |  |  |
| 201,605 | marry | casa |
| 201,606 | to marry | casar |
| . |  |  |
| 253,857 | obstructs | obstruye |
| . |  |  |
| 361,378 | the | el |
| 361,379 | the | la |

Fig. 2

| LN | CLo | LN1 | LN2 | ... | LNi | ... | LNn |
|----|-----|-----|-----|-----|-----|-----|-----|
| 1 | cl | LN1.ie1 | LN2.ie1 | ... | LNi.ie1 | ... | LNn.ie1 |
| 2 | cl | LN1.ie2 | LN2.ie2 | ... | LNi.ie2 | ... | LNn.ie2 |
| . | | | | | | | |
| . | | | | | | | |
| j | cl | LN1.iej | LN2.iej | ... | LNi.iej | ... | LNn.iej |
| . | | | | | | | |
| . | | | | | | | |
| . | | | | | | | |
| n | cl | LN1.ien | LN2.ien | ... | LNi.ien | ... | LNn.ien |

Fig. 3

| NLo | LN1 | LN2 | . . | LNi | . . | LNn |
|---|---|---|---|---|---|---|
| 1 | LN1.A1 | LN2.A1 | . . | LNi.A1 | . . | LNn.A1 |
| 2 | LN1.A2 | LN2.A2 | . . | LNi.A2 | . . | LNn.A2 |
| . | | | | | | |
| . | | | | | | |
| i | LN1.Ai | LN2.Ai | . . | LNi.Ai | . . | LNn.Ai |
| . | | | | | | |
| . | | | | | | |
| . | | | | | | |
| n | LN1.An | LN2.An | . . | LNi.An | . . | LNn.An |

Fig. 4

COMPUTERIZED TRANSLATOR OF LANGUAGES UTILIZING INDEXED DATABASES OF CORRESPONDING INFORMATION ELEMENTS

BACKGROUND OF THE INVENTION

1. Field of the Invention

The present invention relates to a digital coder and decoder of languages, and more particularly, to a system that includes sets of computerized databases with indexed information elements.

2. Description of the Related Art

Many attempts to provide electronic translators in the past have involved the use of cross-referenced lists of words with the attendant problems of each language peculiarities. Many times there are synonyms, idiomatic expressions or other special situations that prevent a user from obtaining an accurate translation of the thought intended to be conveyed. The present invention recognizes that there is a finite number of information elements (such as words, symbols, etc.) in each language and there is also a finite number of structural arrangements for each language. By providing a cross-reference for each element including those a unique index for elements with multiple functions (as verb, adjectives, etc.) and a relationship among the different languages for these elements as well as the relationship of the structural arrangements among the different languages.

SUMMARY OF THE INVENTION

It is one of the main objects of the present invention to provide a system wherein information in one language can be effectively translated to another language.

Still another object of the present invention is to provide a system that can be readily encrypted with minimum overhead.

It is another object of this invention to provide a system for coding and decoding information from several languages.

Yet another object of the present invention is to provide a system that can efficiently convey information using minimum bandwidth.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 shows is a partial table showing the information elements of two languages.

FIG. 3 represents a table for an n-number of indexed information elements in n-number of languages and the information elements also including a characterization for each information element.

FIG. 4 shows a table for an n-number of structural arrangements for n-number of languages.

DETAILED DESCRIPTION OF THE PREFERRED EMBODIMENT

Figure 1:
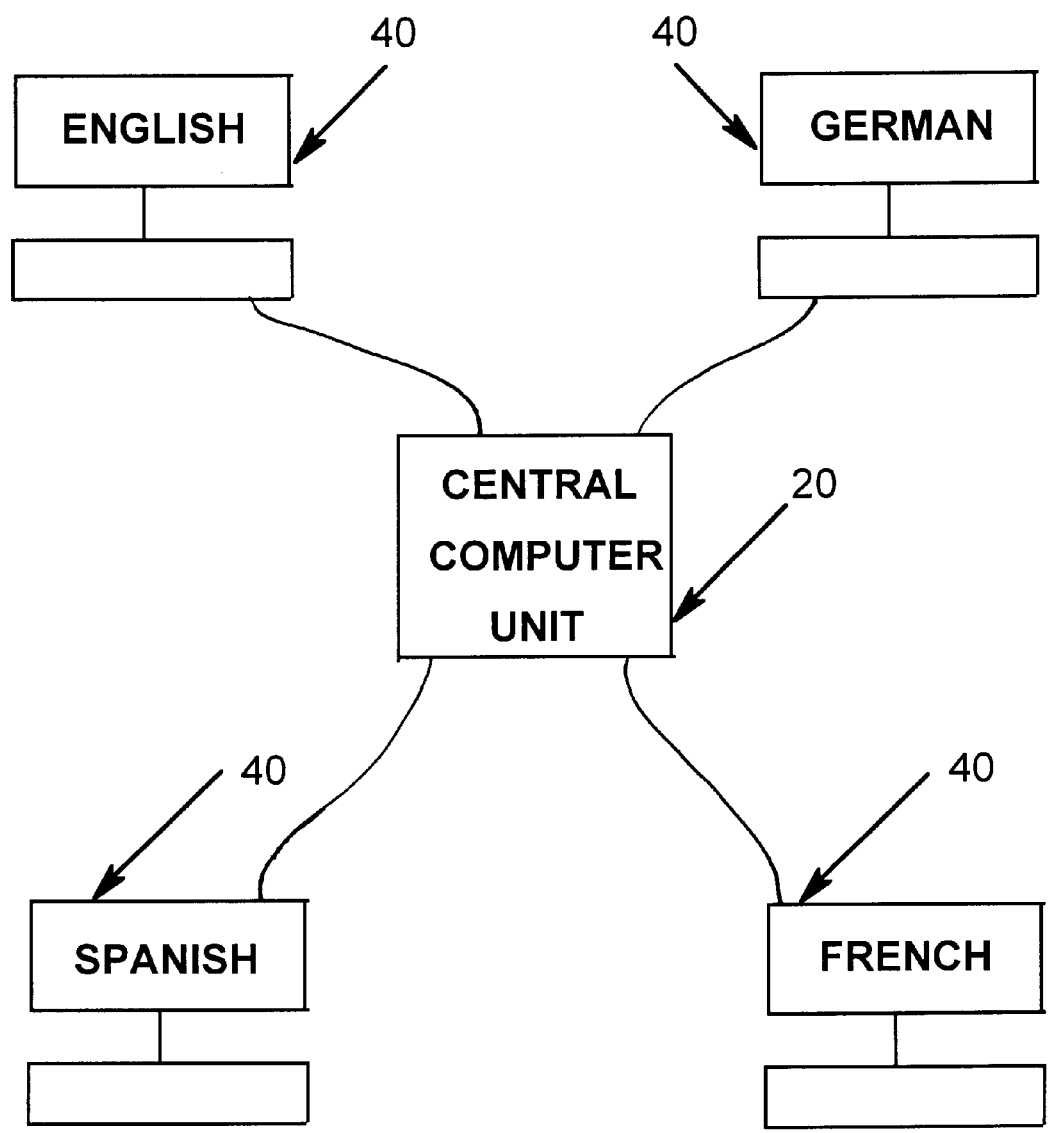
FIG. 1 is a pictorial representation of a computer network as one of the preferred embodiments.

Referring now to the drawings, where the present invention is generally referred to with numeral 10, it can be observed that it basically includes a central computer unit 20 with an associated memory for holding data pertaining to a database of indexed information elements for each language. In one of the preferred embodiments, as shown in FIG. 1, several computer terminals 40 are connected to computer unit 20 to receive and/or send information in one language and further process the output (printing, storing, displaying the output). Any terminal 40 can then effectively communicate with the other one through computer unit 20 in the language for each terminal user.

Starting from the fact that each language has a finite number of words and to these words other information elements such as symbols (®, I (heart) N.Y., W.C. for water closet or sanitary facilities, pictorial representations accepted in the language, etc.) may be added. But, it is important to recognize that the number of these information elements in each language is finite and they can be indexed with a particular number. Also, each of the indexed information elements is classified or characterized depending on what role they play in a language. A particular word can be characterized, for instance, as a noun and also as a verb. In English the word "house" is a noun but it can also be a verb "to house". I the invention's system, the word "house" as a noun could be indexed with number 100,001 and the same word "house" as a verb could indexed additionally as 200,003 as a verb. Then, in another language, such as Spanish, slot 100,001 corresponds to "casa" which means "house" as a noun. The word "house" as a verb corresponds to indexed entry number 200,003 and the same entry corresponds to "albergar" in Spanish which is the infinitive. Additionally, the word "casa" in Spanish means "marry" in a conjugated form and it occupies entry number 201,605, and other verbs with the same root occupy other places.

FIG. 3 shows a table with the first column representing information element entries and the second column represents the characterization of each entry as a verb, noun, etc. Each information element has a corresponding information element in the other languages (LN1 through LNn). Therefore, NLo stands for "Name of Language Zero" which could be taken as a reference language for the purposes of organizing the information only since the computerized system used does not require a particular language as a reference.

Associated with each information element (ie1 through ien) is a "Language Component or class" and there is a finite number of language components characterizing or classifying the information elements, such as verbs, adjectives, etc. Therefore there is cross-reference table that characterizes each one of the indexed information elements throughout all the languages. One way of implementing it is by reserving addresses of information elements of different components or classes. For instance, indexed entry number 100,001 will be a "noun" for all languages, and so forth. One way for readily implementing the characterization of the language component would be to assign certain index numbers for each category, in other words, nouns will be located from 000,001 to 199,999, verbs will be located from 200,000 to 299,999, etc. In this manner, the characterization of the information element is readily available.

In FIG. 4a table shows different indexed structural arrangements which hold true for each language. Structural arrangement number, for instance, could be "The house obstructs the view" which includes language components "definite article"+"noun"+"verb"+"definite article"+"noun". In another language, such as Spanish for instance, there is a corresponding "structural arrangement" with this structure. The system finds the indexed entries for each word and the indexed structural arrangement to form the complete sentence or phrase.

For example:

|361.679| + |100,001| + |253,857| + |361,379| + |115,033| means "The"+"house"+"obtructs"+"the"+"view"

This sentence or phrase indexed entry holds true for all the other languages too. There may be a structural arrangement that does not exist in a particular language. Then, a substitution with the closest structural arrangement can be effected, or a front end software filter could be used to alert a user that it needs to use another structural arrangement that is accepted by the system. Of course, the more complete the system's database are, the less frequent this front end software filter will be accessed.

It is to be noted also that an information element may include more than one word on symbols, and it could include, for instance, a whole paragraph, document or even a book or collection of books.

Once the information elements are assembled in the pertinent structural arrangement, central computer unit 20 provides an output that can be displayed, saved or punted or even transmitted to terminals 40 for display or further processing, as shown in FIG. 1.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A computerized language translation system, comprising:

A) a first indexed database including a predetermined number of languages and a predetermined number of information elements for each language;

B) means for referencing uniquely indexed information elements in a given language to information elements in the other languages;

C) means for characterizing said information elements as a predetermined component class from a predetermined number of component classes in each of said languages;

D) a second indexed database including a predetermined number of structural arrangements for said information elements, said arrangements corresponding to a unique indexed entry in said second indexed database for each combination of component classes;

E) means for detecting and decoding a plurality of information elements in one language to determine the structural arrangement from said second indexed database with the corresponding component classes and indexed entries of the information elements;

F) means for matching said structural arrangements and said information element indexed entries and component classes in one language with other structural arrangements corresponding to other languages; and G) means for assembling said information elements in at least one of the other languages and further including an output.

2. The system set forth in claim 1 further including:

H) means for encrypting said output.

3. The system set forth in claim 2 further including:

I) means for displaying said output.

4. The system set forth in claim 3, further including:

J) means for printing said output.

* * * * *